United States Patent [19]

Drako et al.

[11] Patent Number: 5,446,866
[45] Date of Patent: Aug. 29, 1995

[54] ARCHITECTURE FOR TRANSFERRING PIXEL STREAMS, WITHOUT CONTROL INFORMATION, IN A PLURALITY OF FORMATS UTILIZING ADDRESSABLE SOURCE AND DESTINATION CHANNELS ASSOCIATED WITH THE SOURCE AND DESTINATION COMPONENTS

[75] Inventors: Dean M. Drako, Cupertino; Steven G. Roskowski, Sunnyvale, both of Calif.

[73] Assignee: Apple Computer, Inc., Cupertino, Calif.

[21] Appl. No.: 828,353

[22] Filed: Jan. 30, 1992

[51] Int. Cl.$^6$ ............................ G06F 3/00; G06F 3/14
[52] U.S. Cl. ........................... 395/500; 395/275; 395/153; 395/154; 364/DIG. 1; 364/239; 364/239.9
[58] Field of Search ............... 395/200, 275, 250, 425, 395/500, 325, 153, 154; 358/183; 345/155

[56] References Cited

U.S. PATENT DOCUMENTS

| | | | |
|---|---|---|---|
| 4,413,319 | 11/1983 | Schultz | 395/275 |
| 4,485,438 | 11/1984 | Myrmo | 395/325 |
| 4,604,743 | 8/1986 | Alexandru | 370/85.11 |
| 4,644,401 | 2/1987 | Gaskins | 358/183 |
| 4,777,485 | 10/1988 | Costello | 340/799 |
| 4,897,799 | 1/1990 | Le Gall et al. | 364/514 |
| 4,926,420 | 5/1990 | Shimizu | 370/94.1 |
| 4,941,089 | 7/1990 | Fischer | 395/325 |
| 4,947,257 | 8/1990 | Fernandez et al. | 358/183 |
| 4,949,207 | 8/1990 | Pickett | 395/325 |
| 5,025,398 | 6/1991 | Nelson | 395/112 |
| 5,060,140 | 10/1991 | Brown et al. | 395/325 |
| 5,175,825 | 12/1992 | Starr | 395/325 |
| 5,222,216 | 6/1993 | Parish et al. | 395/275 |
| 5,230,041 | 7/1993 | Dinwiddie et al. | 395/162 |
| 5,241,658 | 8/1993 | Materson et al. | 395/162 |
| 5,363,489 | 11/1994 | Snyder | 395/275 |

FOREIGN PATENT DOCUMENTS 2216759 10/1989 United Kingdom .

OTHER PUBLICATIONS

IBM Technical Disclosure Bulletin, vol. 6, No. 1, Jun. 1963, New York US, pp. 82–84, R. M. Meade et al., "Data Flow Control System".
IBM Technical Disclosure Bulletin, vol. 19, No. 6, Nov. 1976, New York US, pp. 2348–2349, J. M. McCrossin, "Device–Independent Display Support Facility".
IBM Technical Disclosure Bulletin, vol. 34, No. 4B, Sep. 1991, New York US, pp. 265–270, "Synchronous Digital Video Switch".

*Primary Examiner*—Thomas C. Lee
*Assistant Examiner*—D. Dinh
*Attorney, Agent, or Firm*—Blakely, Sokoloff, Taylor & Zafman

[57] ABSTRACT

An arrangement for transmitting information from a first component of a computer system to a second component of the computer system including a source channel associated with the first component of the computer system; a destination channel associated with the second component of the computer system; apparatus for interconnecting the source and the destination channels; the source channel including apparatus for creating a stream of information in a prescribed format, apparatus for designating a destination channel as an address for the stream of information, and apparatus for transferring the stream of information to the apparatus for interconnecting the source and the destination channels; and the destination channel including apparatus for receiving a stream of information in the prescribed format from the apparatus for interconnecting the source and the destination channels, apparatus for receiving control signals apart from the stream of information, and apparatus for controlling the use of the stream of information in response to the control signals.

25 Claims, 5 Drawing Sheets

ARCHITECTURE FOR TRANSFERRING PIXEL STREAMS, WITHOUT CONTROL INFORMATION, IN A PLURALITY OF FORMATS UTILIZING ADDRESSABLE SOURCE AND DESTINATION CHANNELS ASSOCIATED WITH THE SOURCE AND DESTINATION COMPONENTS

BACKGROUND OF THE INVENTION

1. Field of the Invention

This invention relates to computer architecture and, more particularly, to an architecture and apparatus for effectively associating a plurality of different sources of information with a plurality of different destinations for such information in a computer system.

2. History Of The Prior Art

Computer designers are working toward providing systems which will allow an operator sitting at a personal computer to call up information from a number of different sources. For example, it is expected that a person will be able to hear telephone and radio communications, view television or recorded motion pictures, play stereo recordings of music, and operate computer graphical and text programs. It is also expected that all of these operations will be possible at the same time so that, for example, a television program may be displayed in one window of an output display while a computer graphics program is running in another window of the same display or computer graphics material is displayed as an overlay on the television program.

Not only are these designers interested in taking information from a plurality of different sources, they are also interested in utilizing such information at a number of different destinations all of which may operate in different formats. For example, information might be presented on a computer output display, sent to a television set, transferred to a stereophonic sound system, sent to a local area network, or furnished to a myriad of other devices.

Many, if not all, of the sources of information which one would like to utilize present information in entirely different formats. For example, video information may be offered in the format used for television transmission while computer processors and sound systems provide information in other formats. If television (video) signals are to be displayed with computer graphics signals on the same output monitor, the analog television signals should first be converted to digital representations for presentation on a computer monitor. Moreover, the television signals are presented at a different frequency in an interlaced pattern consisting of two time-separated fields while a typical computer display presents more lines of data in a non-interlaced mode. Although both types of signals are electrical, they arrive in entirely different formats for their two purposes.

To complicate the problem, the various destinations to which information is directed from these diverse format sources may in a similar manner operate in formats which are different from each other and from the formats of the sources. For example, to present television and graphics signals on the same output display requires that the format of one or the other be changed to the format which the output display utilizes.

The transferring of information from one format to another has usually been done on an ad hoc basis so that it must be repeated for each source of information and each destination for information to be used with each computer system. This is not an economic or logical process for developing computer systems.

SUMMARY OF THE INVENTION

It is, therefore, an object of the present invention to present an organized versatile architecture for allowing the use of information in many different formats in a single computer system.

It is another more specific object of the present invention to provide an architecture for a computer system which separates each source of information furnished to a computer system from each destination for such data and provides a small number of standardized communication formats which all destinations must accept.

Another object of the invention is to allow any source of information to connect to any destination for information by any arbitrary interconnection arrangement.

An additional object of the present invention is to provide generalized sharing of different destinations for information by different sources of information.

An additional object of a particular embodiment of the present invention is to provide generalized screen sharing by different sources of information on a computer output display.

It is yet another object of the present invention to provide extremely rapid transfer of large portion of data to a single address at a source within a computer system and thereby increase the transfer speed of data.

These and other objects of the present invention are realized in an arrangement for transmitting information from a first component of a computer system to a second component of the computer system comprising a source channel associated with the first component of the computer system; a destination channel associated with the second component of the computer system; means for interconnecting the source and the destination channels; the source channel comprising means for creating a stream of information in a prescribed format, means for designating a destination channel as an address for the stream of information, and means for transferring the stream of information to the means for interconnecting the source and the destination channels; and the destination channel comprising means for receiving a stream of information in the prescribed format from the means for interconnecting the source and the destination channels, means for receiving control signals apart from the stream of information, and means for controlling the use of the stream of information in response to the control signals.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These representations are the means used by those skilled in the data processing arts to most effectively convey the substance of their work to others skilled in the art.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
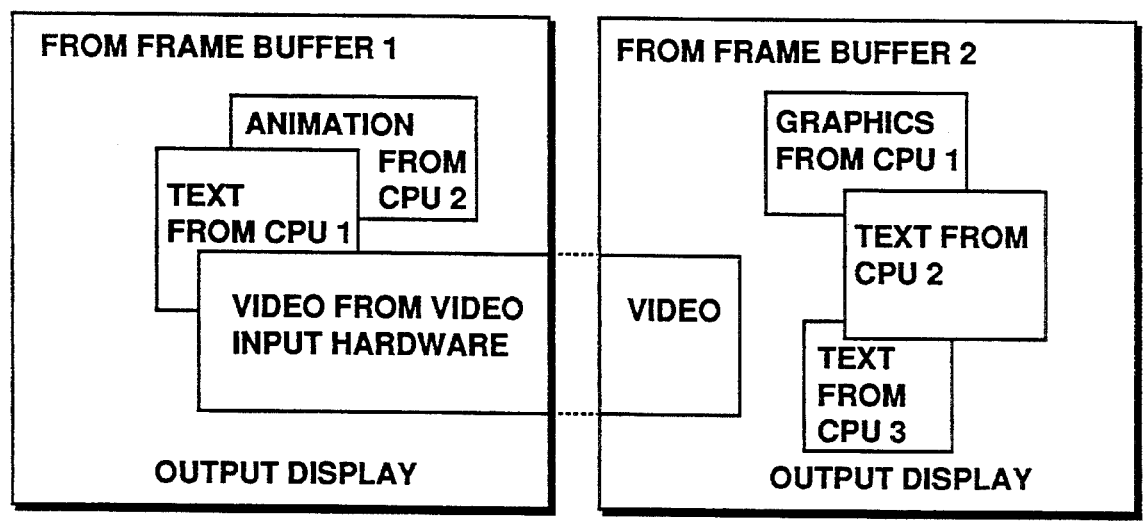
FIG. 1 is a block diagram illustrating a desired presentation of information on a pair of computer output displays.

Referring now to FIG. 1, a view of two computer output displays is illustrated. In each of these displays, information is presented in individual windows from a number of different sources. The left display includes a window in which text material is displayed, a window in which animated output appears, and a window in which television (video) signals are shown. The right display includes two windows displaying text materials, one displaying graphics materials, and a window displaying another portion of the television program being displayed in the window on the left display.

The information in the various windows on the two output displays may come from a number of different sources and arrive in different formats. For example, the text materials, the animated presentation, and graphics materials may come from one or more central processing units operating under program control. The television signals may be provided by a video source such as a tape recorder or a television receiver.

Not only may the formats in which the information furnished by the sources be different, the format of the output displays may well be different. For example, the television displayed on the two output displays may appear in color on one output display and in black and white on the other. Whatever the format used by the source of information and whatever the format of the output displays, all of the information which is to displayed must somehow be stored in frame buffers which store the information presented on an output display. The fact that this is accomplished is indicated in FIG. 1 by labeling the information on the left output display as coming from frame buffer 1 and the information on the right output display as coming from frame buffer 2.

Figure 2:
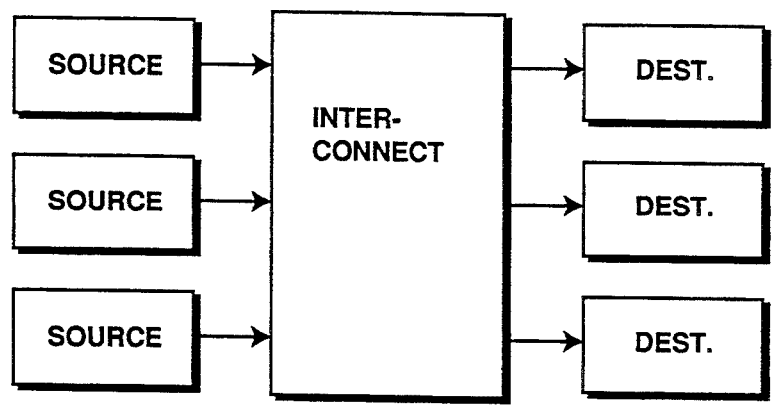
FIG. 2 is a generalized view of the system architecture proposed by the invention.

Of course, not only may information handled by a computer be presented on one or more output displays as illustrated in FIG. 1, information is often transferred to output devices such as modems, local area networks, and loud speakers. FIG. 2 illustrates in general form a number of different input sources and a number of different destination devices connected by an arbitrary interconnection arrangement. Such an arbitrary arrangement might include a system bus, a cross-bar switching arrangement (see for example, assignee's patent application U.S. Ser. No. 07/816,346, filed Dec. 30, 1991), or some other well known interconnecting arrangement. Sources which might provide information to be used by such a system include central processing units, video input sources, video decompression sources, networks, input/output devices, memory, sound input sources, VCRs, and mass storage devices. Destination devices which might be used in such a system include video output devices such as tape recorders and displays, frame buffers, networks, memory arrays, sound output systems, VCRs, and mass storage devices. Of course, other source and destination devices will occur to those skilled in the art. Certain devices may well function as both sources and destinations other than those already described; these include circuitry for accomplishing video effects, video filtering, and size scaling.

Although the example shown in FIG. 1 relates to the provision of input data from multiple sources to output displays, the invention might as well be used for combining information from a variety of sources at any of the other destination devices. For example, it may be desirable to mix information representing sound from a number of different sources for use by a single sound output system. Consequently, though the invention is generally described in this specification in terms of a destination device which is a computer output display, it should be recognized that the invention may be used to allow a plurality of sources to furnish information to be used by any such source the typical ones of which have been described above.

Figure 3:
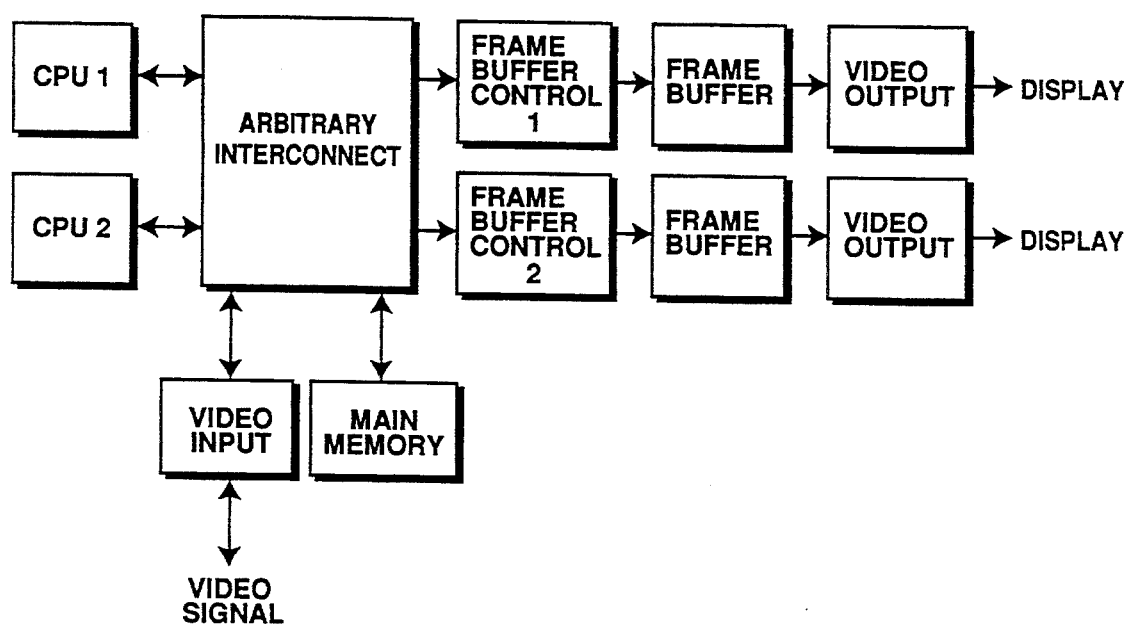
FIG. 3 is a more detailed block diagram of a particular generalized system architecture in accordance with the invention.

FIG. 3 illustrates in more detail a general architecture in accordance with the invention which is adapted to produce the results illustrated in FIG. 1. In the arrangement illustrated, a pair of central processing units (CPUs 1 and 2) furnish input to an arbitrary interconnect; and output is provided to a pair of frame buffers though two frame buffer controllers for display on a pair of output displays. A memory array and video input hardware are also illustrated which are each capable of acting as either sources of or destinations for information.

Figure 4:
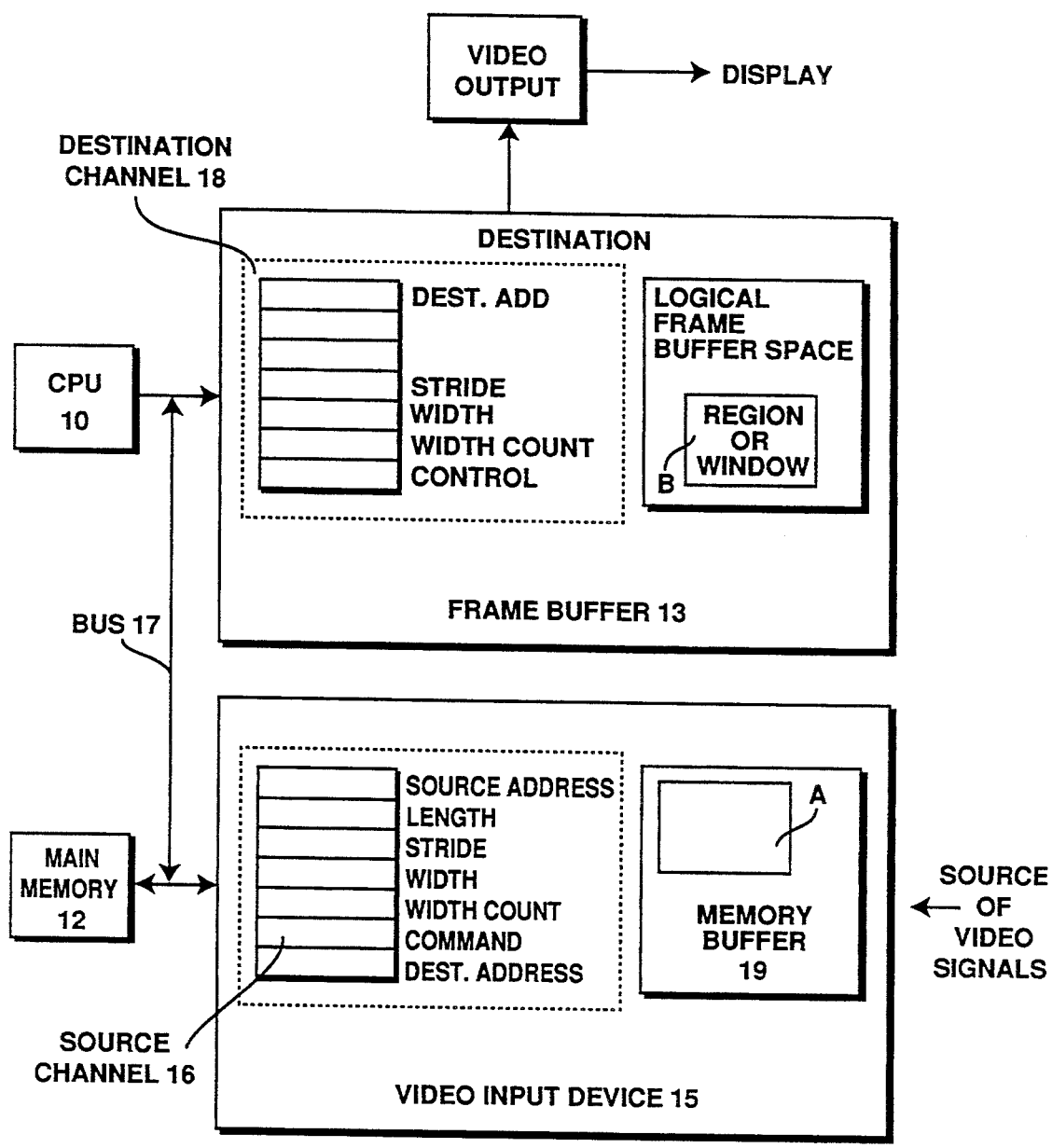
FIG. 4 is a block diagram illustrating a general view of a particular embodiment of a computer system constructed in accordance with the invention.

FIG. 4 illustrates an exemplary portion of the architecture within the general arrangement illustrated in FIG. 3 for accomplishing the results illustrated in FIG. 1 in a rational and economic manner. The exemplary portion of the arrangement described includes a central processing unit 10, main memory 12, a frame buffer 13, and a video input device 15. All of these portions of the system are connected by an arbitrary means for transferring both data and addresses such as a system bus 17. Each of the video input device 15, the main memory 12, and the frame buffer 13 may function as either a source of information or a destination for information or both. The video input device 15, however, will probably be just a source of information; and the frame buffer 13 will probably be just a destination for information.

Associated with each source of information in the system is a source channel such as the source channel 16 shown as a part of the video input device 15. Associated with each destination for information in the system is a destination channel such as the destination channel 18 shown as a part of the frame buffer 13. There may be a plurality of either source or destination channels on a device, but for the purpose of explanation, only one of each such channels is discussed. The source and destination channels 16 and 18 provide the arrangement whereby sources of and destinations for information may be essentially separated so that any source may provide information to any destination and any destination may receive information from any source without either source or destination having knowledge of the other except that the source understands that the information is to be sent to a single address in a particular format. This address indicates that the information is for a particular destination channel. The destination must also be able to receive data in the format in which data is sent by the source.

Thus, a source channel 16 directs all of its information through the arbitrary interconnect to the single address which designates a particular destination channel 18. The address indicates to the arbitrary interconnect where the data should be routed. The destination channel 18 which receives the information then determines how it is handled (including, in some cases, the final destination). Thus the information is addressed to a single address, the destination channel; and the data is all transferred to that address. The destination channel 18 does whatever needs to be done in using the information being transferred. The data itself is transferred from the source channel 16 to the destination channel 18 without any of the usual size, width, location, format, or other control information which is typically transferred from an input device to an output device with each piece of data. For example, video data may be presented to a video input device in typical television format, be changed to an internal format at the video input device, and sent by the source channel to a particular destination channel such as that associated with a frame buffer.

The control information with regard to how the destination channel will process or handle the incoming data (for example, the exact location where the destination channel is to place the information) is separately described in control information sent by the central processing unit to the destination channel 18. This method of sending information contrasts with prior art systems where each piece of information to be sent (each pixel, for example) is directed to its individual address by the source of the information. The destination channel receives the information from the source channel, performs any additional format translation necessary for that information to be used at the destination, and directs the information to the addresses at which it may be used.

It should be noted that although the source and destination channel arrangements operate in this unique manner, the system may be made to function as well with arrangements which address information in the conventional manner to each individual memory position. Since the source and destination channels associated with a system use only a very few (say one hundred) of the addresses typically available in a computer system (e.g., one million), those addresses may be stored and compared by a comparator for each system transaction. A transfer from a source channel to one of the destination channels will activate the circuitry of the present invention while a transfer to another address will use the standard system arrangements for transferring data. Consequently, ordinary devices not using the source and destination model described can coexist in the same system without adverse effects.

In order to allow the use of source and destination channels, it is necessary that at least one communication format be selected by which information may be transferred between those channels. In the preferred embodiment of the invention four different stream types or formats are utilized. By selecting four formats which are used quite often by typical computer devices likely to be joined to a system, the amount of translation between formats at the source and the destination channels may be greatly reduced. Since four stream types are used, however, each destination channel must be able to accept information in all four of these formats although it is only necessary that any source device be able to send at least one stream type.

In the preferred embodiment, a first stream type is referred to as "sixteen gray"; in this format each pixel of information contains eight bits of so-called alpha information and eight bits of intensity information. In a second stream type referred to as "thirty-two RGB" each pixel of information contains eight bits of so-called alpha information and eight bits each of red, green, and blue information. In a third stream type referred to as "thirty-two gray" each pixel of information contains sixteen bits of so-called alpha information and sixteen bits of intensity information. In a fourth stream type referred to as "sixty-four RGB", each pixel of information contains sixteen bits of so-called alpha information and sixteen bits each of red, green, and blue color information. In all of these formats, the pixel information is normally furnished in a sequence so that if describing a frame on an output display, the pixels can be scanned to the display from left to right and from top to bottom.

As pointed out, in order to guarantee that every source can communicate with every destination, it is necessary that each source channel provide its information in one of the prescribed four stream formats and that each destination channel be able to receive data in all of these four formats. If a source device naturally uses information in other than these four formats, then the source channel must provide the means for translating the information from its natural format to one of the four formats. If a destination device desires information in a particular format other than the four stream formats, then the destination channel must provide this translation. However, this translation need only be accomplished by that single source or destination channel which requires the particular format, not by all of the sources sending to that destination. For example, a destination device which requires video data in a YUV data format will convert data to that format from all of the standard formats rather than requiring all of the sources to convert the data.

When information is to be transferred from a source to a destination, the central processing unit 10 directs the source by means of the source channel 16 to select the information and to send it to a particular address. The source channel 16 includes circuitry for selecting the information and placing it on the system communications channel such as the bus 17. The central processing unit 10 also directs the destination through the destination channel 18 to place the information at a described location and prescribes the format in which the information will arrive. If the information must be translated from one format to another in transferring it to or from a stream format, this is accomplished at the source under control of the source channel and at the destination under control of the destination channel. The central processing unit of the computer system controls the source and destination channels by writing information to registers associated with each channel.

The particulars by which the source and destination channels 16 and 18 accomplish their operations will vary from device to device. The arrangement allows great latitude in the particular manner in which each device is constructed so that individual arrangements will obviously develop in different ways. The arrangement offers a number of advantages not the least of which is that no excess circuitry need be developed on an ad hoc basis for each piece of equipment used in the system. For example, the destination channel 18 for the frame buffer 13 is capable of receiving information from all types of sources so long as those sources provide the information in one of the prescribed stream formats.

As is illustrated in FIG. 4, the central processing unit 10 is connected by address and data bus 17 to the main memory 12 and to the video input device 15. The video input device 15 includes a source channel 16 which is described in detail in FIG. 5 hereafter. The video input device 15 receives video frames which are to be written to a frame buffer 13. A memory buffer 19 receives signals from a source of video signals which may furnish those signals in the National Television Standards Committee (NTSC) format or other format. If the NTSC format is used, the video signals are stored in the memory buffer as two interlaced fields of 240 lines each.

For this particular example, it is presumed that the buffer memory 19 stores a frame of video information which is represented by the rectangular outline of the buffer 19. It is also presumed that the source channel 16 has been configured (by addressing a portion of buffer 19) to provide the portion of video information stored in the memory buffer 19 in the position of the smaller rectangle A described therein to the system bus 17 for transfer to the frame buffer 13. The system is, of course, capable of transferring any rectangular region of the frame stored in the buffer 19.

Figure 5:
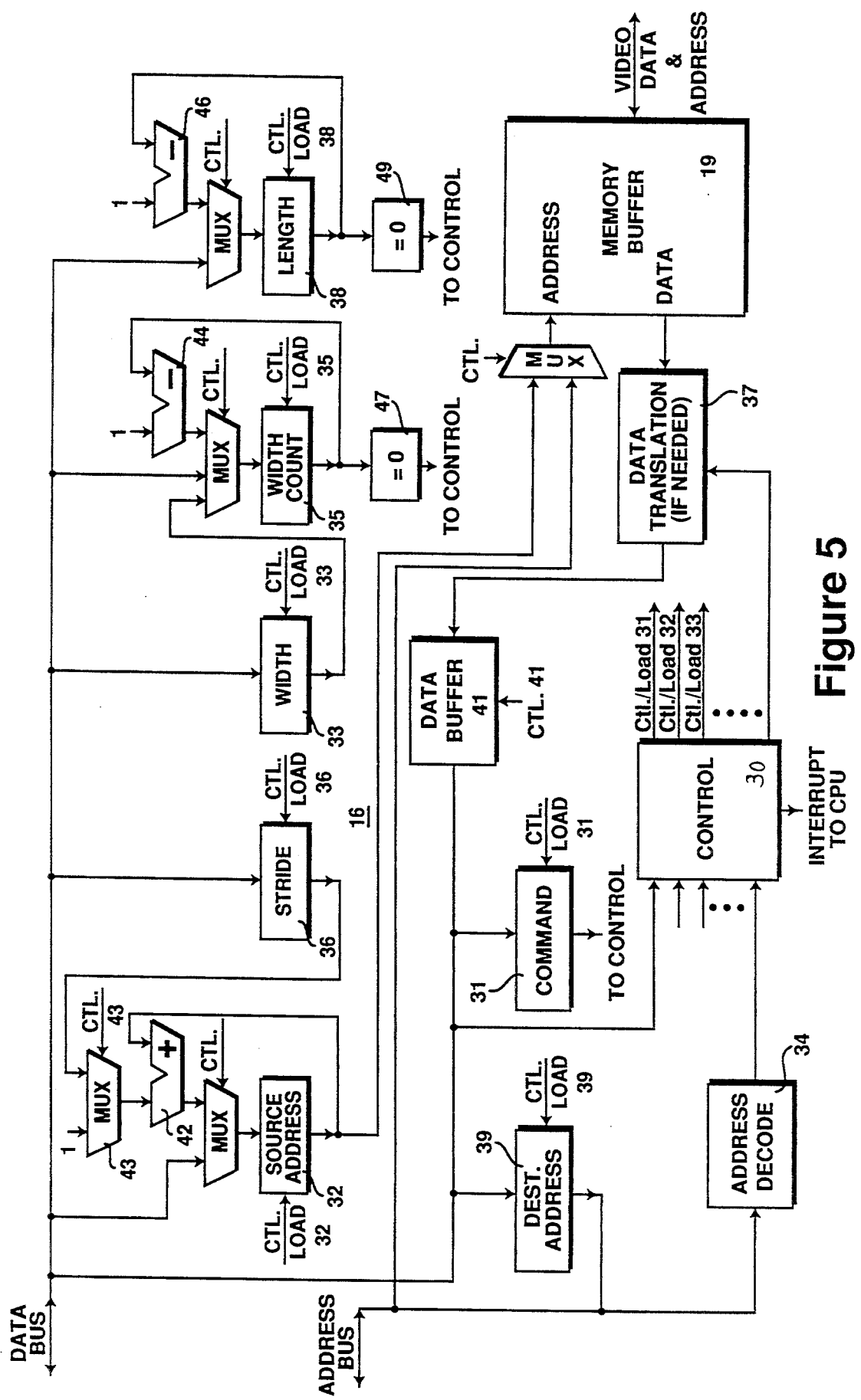
FIG. 5 is a more detailed block diagram illustrating one portion of the system described in FIG. 4.

The source channel 16 illustrated in FIG. 5 includes control circuitry 30 which is connected to the address bus by an address decode circuit 34 and to the data bus to operate in response to control signals provided by the central processing unit 10. In the preferred embodiment of the invention, the control circuitry 30 may be a state machine constructed in a manner which is well known in the art to provide the signals discussed hereinafter. In a particular system, on the other hand, the control circuitry 30 might be a processor adapted to execute commands to provide the particular outputs instead of a state machine.

Associated with the control circuitry 30 of the source channel 16 are a plurality of registers including a command register 31, a source address register 32, a width register 33, a width count register 35, a stride register 36, a length register 38, and a destination address register 39. All of these registers are connected to receive data on the system data bus. When the address of a particular register is placed on the address bus by the central processing unit for a write operation, the address decode circuit 34 indicates this to the control circuit 30. The control circuit 30 provides a control signal to load the data from the data bus into the corresponding addressed register.

The command register 31 is addressed by the central processing unit 10 and receives and stores the particular command which the central processing unit 10 desires to have executed. In general, this may be considered to be one of a number of commands directing the source channel 16 to provide the particular information stored at the source (e.g., in the memory buffer 19) on the data bus for transmission to a particular destination. Also included is the format information so that if translation of the data is required, this may be accomplished. This command is provided by the command register to the control circuitry 30 for accomplishing the operation. The control circuitry 30 signals the format to a translation circuit 37 which accomplishes any translation necessary in a manner well known to the prior art. The source address register 32 receives from the central processing unit 10 the initial source address illustrated in the figure as the address designating the upper left-hand corner of the rectangle A to be transferred from the memory buffer 19. Beginning at this address, the control circuitry 30 causes the pixel information stored at the initial source address to be placed in a buffer 41 for transfer to the data bus. The control circuitry 30 then furnishes a signal to a multiplexor 43 causing a value of one to be furnished to an adder circuit 42. The adder circuit 42 uses the one value to increment the source address in the source address register 32 by one pixel in the X direction along a horizontal row of the rectangle A and stores the result in the source address register 32. The next pixel from the buffer 19 will be obtained from this new address in the register 32.

The width register 33, in the meantime, has received from the central processing unit 10 a value designating the width in pixels of a line (horizontal row) of the rectangle A. This value is also placed in the width count register 35 and counted down under control of the control circuitry 30. The control circuitry 30 furnishes a signal to a subtractor circuit 44 to cause it to reduce the count stored in the width count register 35 by one. The length register 38 receives from the central processing unit 10 under control of control circuitry 30 a value indicating the total length in pixels of the information in the rectangle to be transferred. With each pixel furnished to the buffer 41, the length value held in the length register 38 is reduced by one. This is accomplished by the control circuitry 30 using a subtractor circuit 46.

The control circuitry 30 continues to transfer pixels, one at a time, to the buffer 41 for transfer to the data bus. With each pixel, the source address is incremented by one pixel, the width count is reduced by one, and the length is reduced by one. When the width count reaches zero as determined by a comparator 47, a signal is sent to the control circuitry 30. In response to this signal, the control circuitry 30, using the adder circuit 42, adds an amount stored in the stride register 36 to the address in the source address register 32 to provide the beginning address of the next lower row of the rectangle A being transferred. The value held in the stride register 36 is the address difference between the last position on a line of the rectangle A being transferred and the first position on the next line; this value is furnished to the stride register 36 by the central processing unit 10 under control of the control circuit 30. At the same time, the control circuitry 30 causes the value stored in the width register 33 to replace the zero in the width count register 35 so that a new line count may begin.

As this transfer of data continues, the information is furnished from the buffer 41 to a destination address provided by the central processing unit 10 to the destination address register 39. When the value held in the length register 38 has been counted to zero, a comparator 49 signals this to the control circuitry 30. The control circuitry 30 recognizes this signal as an indication that the transfer of the rectangle A from the source has been completed, ceases transferring information to the buffer 41, and by means of an interrupt signals the central processing unit 10 that the sourcing of the information has been completed.

It will be appreciated by those skilled in the art that the particular source channel 16 described is used as an example of the presently preferred embodiment only and might be substantially modified. In fact, it is a specific goal of the architecture that the specifics of the channel functions not be defined, only that each channel be able to send or receive data in the appropriate stream formats. For example, X and Y coordinate registers and a row counter might be used to replace the length register 38. These could be used to count down the number of rows in the rectangle A to provide a signal indicating the end of information from the source. Other modifications will occur to those skilled in the art.

Figure 6:
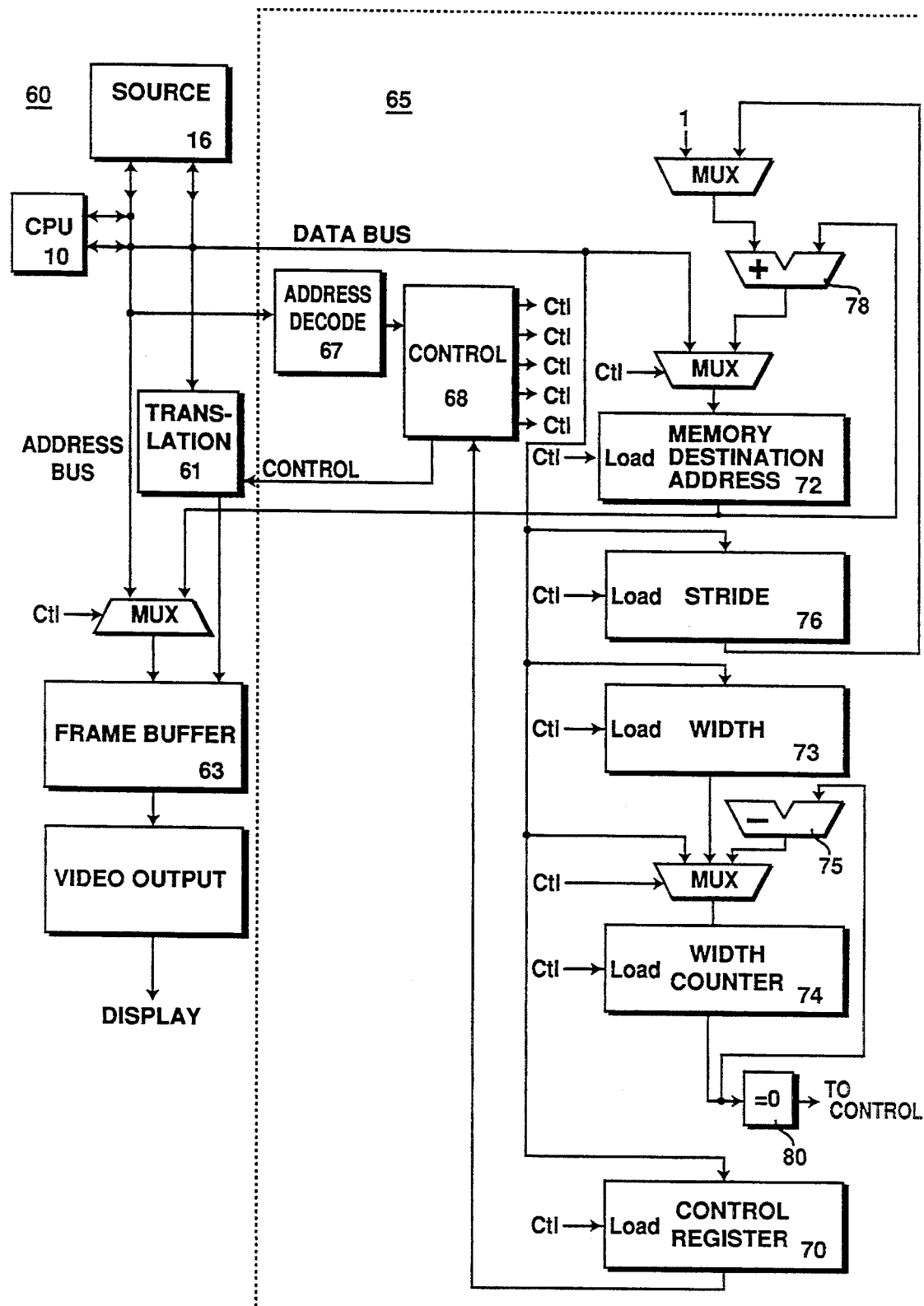
FIG. 6 is another more detailed block diagram illustrating a second portion of the system described in FIG. 4.

FIG. 6 illustrates a circuit 60 including a central processing unit 10, a source of information 16, and a presently preferred embodiment of a destination channel 65 for the frame buffer 63. When information is furnished by a source 16, the data is placed on the data bus and the address of the data is placed on the address bus. If the information is to be ultimately directed to the frame buffer memory 63 by the destination channel 65, the central processing unit 10 will have provided to the destination channel 65 information indicating where the data from the source 16 is to be stored in the frame buffer 63. The central processing unit will also have directed the source 16 to send the data to an address which indicates the destination channel 65. The address provided by the source when sending the data indicates that the destination channel 65 is the destination for the data.

In a typical (prior art) system, when a source sends a piece of data to a destination, the address will indicate which destination and where in the destination the piece of data should go. In this architecture, this prior art technique still works, but in addition, some addresses indicate "destination channels." If a destination channel address is specified then the address only indicates which destination and which channel. It does not indicate where in the destination the information is directed.

The destination channel 65 includes an address decode circuit 67, a control circuit 68, and a number of registers including a control register 70, a memory destination address register 72, a width register 73, a width count register 74, and a stride register 76. As in the source channel, the control circuitry 68 of the preferred embodiment of the invention may be a state machine constructed as is well known in the art to provide the signals discussed hereinafter. In a particular system, the control circuitry 68 might also be a processor adapted to execute commands to provide the particular outputs instead of a state machine. The control register 70 stores information designating the operation to be carried out including the particular stream format in which the stream of information will be presented. This information is furnished by the central processing unit 10 and controls the translation by a translation circuit 61 of information furnished to the format required for storage in the frame buffer memory 13. It will be recognized that the translation circuit 61 is optional depending on the need to translate information once it has reached the destination channel to a format to be used by the destination device.

The destination address register 72 stores information from the central processing unit 10 indicating the initial position in the frame buffer 63 at which the information is to be stored, for example, the upper left hand corner of region B. As with the source channel 16 described above, the address in the destination address register 72 is incremented with each pixel as the stream of pixels is furnished. The width register 73 stores the width of the area and is initially loaded by the central processing unit 10. This value is furnished to the width count register 73 at the start of the first and each succeeding line of the destination rectangle. The width value in the width count register is counted to zero by a subtractor circuit 75 to determine the width of the destination rectangle B. At the end of each line, a comparator 80 measuring the value in the width count register 74 provides a signal to the control circuitry 68. In response to this signal, the control circuitry 68 causes a value furnished by the central processing unit 10 and stored in the stride register 76 to be furnished to an adder 78 to update the destination address to the new line start value. When the last line is ultimately reached and ends, no new signals appear so the destination rectangle is complete.

It will be obvious to those skilled in the art that a destination channel similar to the channel 65 may be used with any destination device such as the main memory associated with such a computer system. Although no length register is used in the destination register illustrated, it might in some cases be desirable to include such a register or a row count register to accomplish the same purpose. In any case, particular destination registers will certainly differ with the characteristics and the formats of the particular information being furnished by the sources of information.

The source and destination channels which have been described in this specification allow a computer system to be constructed in a manner that multiple sources may supply data to multiple destinations when both the sources and the destinations operate in different formats without the necessity of translating the data on an ad hoc basis at each step of the process and without the requirement for indicating with each individual element of information all of the operations to be performed with regard to that element of information. The source channel simply sends a stream of data in one of the prescribed formats to a single address which is the destination channel, and the destination channel operating under orders from the central processing unit or other unit uses the information in the desired manner. This is in sharp contrast to prior art arrangement for transferring information in computer systems.

It should also be reiterated that each device connected to the system may make use of multiple channels so that information may be directed to more than one destination or received from more than one source simultaneously. Moreover, it should be understood that the arrangement is useful for transferring any type of information, not just the pixel information referred to in the detailed example.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An arrangement for transmitting information from a first component of a computer system to a second component of the computer system comprising:
    a processor;
    a source channel associated with the first component of the computer system, wherein information for transfer from the first component to the second component is initially transferred from the first component to the source channel;
    a destination channel associated with the second component of the computer system, wherein the destination channel and the second component are separately addressable by the source channel, the destination channel being operative to control transfer of information to the second component when the destination channel is addressed by the source channel;
    means for interconnecting the source and the destination channels;
    wherein the source channel comprises:
        means for creating a stream of information in a selected one of a plurality of prescribed formats using information received from the first component;
        means for designating the destination channel as an address for the stream of information; and
        means for transferring the stream of information to the means for interconnecting the source and the destination channels;
    and the destination channel comprises:
        means for receiving the stream of information in any of the plurality of prescribed formats from the means for interconnecting the source and the destination channels;
        means for receiving control information from the processor apart from the stream of information; and
        means for controlling transfer of the stream of information to the second component in response to the control information when the destination channel is designated as the address for the stream of information.

2. An arrangement for transmitting information from a first component of a computer system to a second component of the computer system as claimed in claim 1 in which the means for creating a stream of information in a selected one of a plurality of prescribed formats comprises: means for storing information to be translated into the stream of information;
    means for selecting a starting point in the information stored by the means for storing information;
    means for selecting an ending point in information stored by the means for storing information; and
    means for separating information from the starting point to the ending point for the stream of information.

3. An arrangement for transmitting information from a first component of a computer system to a second component of the computer system as claimed in claim 2 in which the means for controlling transfer of the stream of information to the second component in response to the control information comprises:
    means for storing information from the stream of information;
    means for selecting a starting point in the means for storing information;
    means for selecting an ending point in the means for storing information; and
    means for placing the stream of information from the starting point to the ending point of the means for storing information.

4. An arrangement for transmitting information from a first component of a computer system to a second component of a computer system as claimed in claim 1 in which the means for controlling transfer of the stream of information to the second component in response to the control information comprises:
    means for storing information from a stream of information;
    means for selecting a starting point in the means for storing information;
    means for selecting an ending point in the means for storing information; and
    means for placing a stream of information from the starting point to the ending point of the means for storing information.

5. An arrangement for transmitting information from a first component of a computer system to a second component of the computer system as claimed in claim 1 in which the means for creating a stream of information in a selected one of a plurality of prescribed formats comprises means for varying a portion of the elements of the stream of information to indicate the format.

6. An arrangement for transmitting information from a first component of a computer system to a second component of the computer system as claimed in claim 1, wherein said source channel further comprises means for translating information to the selected one of the plurality of prescribed formats.

7. An arrangement for transmitting information from a first component for a computer system to a second component of the computer system as claimed in claim 1, wherein said destination channel further comprises means for translating information from the selected one of the plurality of prescribed formats to another format.

8. A method for transmitting information from a first component of a computer system to a second component of the computer system comprising the steps of:
    receiving information from the first component by a source channel associated with the first component;
    creating a stream of information in a selected one of a plurality of prescribed formats by the source channel;
    designating a destination channel associated with the second component as an address for the stream of information, wherein the second component and the destination channel are separately addressable;

transferring the stream of information by the source channel via an interconnect, wherein the source channel, the destination channel, and the second component are coupled to the interconnect;

sending control information apart from the stream of information by a processor; and controlling the transfer of the stream of information to the second component by the destination channel in response to the control information.

9. A method for transmitting information from a first component of a computer system to a second component of the computer system as claimed in claim 8 in which the step of creating a stream of information in a prescribed format comprises the steps of:

storing information to be translated into a stream of information;

selecting a starting point in information to be translated which has been stored;

selecting an ending point in information to be translated which has been stored; and separating information from the starting point to the ending point for the stream of information.

10. A computer system comprising:

a central processing unit;

a source channel coupled to a first component, the first component initially transferring information for transfer to a second component to the source channel;

a destination channel coupled to the second component, the destination channel and the second component being separately addressable; and an interconnect for interconnecting the source and destination channels, wherein the source channel comprises circuitry for creating an information stream in a selected one of a plurality of prescribed formats and for transferring the information stream to the interconnect, wherein the information stream includes no control information regarding the information stream, and the destination channel comprises circuitry for receiving information streams having any one of the plurality of prescribed formats from the interconnect and for receiving control information from the central processing unit, wherein the destination channel controls transfer of the information stream from the interconnect to the second component in response to the control information when the destination channel is addressed by the source channel.

11. The computer system of claim 10, wherein the control information includes information regarding a location of the second component where the destination channel is to place the information stream.

12. The computer system of claim 11, wherein the source channel further comprises:

a memory buffer for storing information; and a data buffer coupled to the circuitry for creating the information stream and the memory buffer, the data buffer for storing the information stream, wherein information is retrieved from the memory buffer and loaded in the data buffer as the information stream in response to the circuitry for creating the information stream.

13. The computer system of claim 12, wherein the circuitry for creating the information stream comprises:

a first register for storing information designating the selected one of the plurality of prescribed formats;

a second register for storing a first value specifying an address of the memory buffer, wherein the first value initially designates a starting point of the information stream and is incremented as information is loaded from the memory buffer to the data buffer;

a third register for storing a second value specifying a length of the information stream, wherein the second value is decremented as information from the memory buffer is loaded in the data buffer; and control circuitry for loading the data buffer in response to information stored in the first, second and third registers.

14. The computer system of claim 13, wherein the memory buffer stores information as rows, the circuitry for creating the information stream further comprising:

a fourth register for storing a third value specifying a width of a row, wherein the third value is decremented as information is loaded from the memory buffer to the data buffer;

a fifth register for storing a fourth value specifying an address of a next row, wherein the control circuitry causes the second register to increment the address of the memory buffer by the fourth value when the third value is zero.

15. The computer system of claim 14, wherein the first, second, third and fourth values are supplied by the central processing unit.

16. The computer system of claim 11, wherein the second component includes a frame buffer and said destination channel loads the frame buffer with the information stream in response to the control information.

17. The computer system of claim 16, wherein the first component includes a video input device.

18. The computer system of claim 11, wherein the computer system further comprises a third component having a second source channel coupled to the interconnect, the second source channel for creating a second information stream in a second one of the plurality of prescribed formats that is different than the selected one of the plurality prescribed formats for the information stream, the second source channel for transferring the second information stream to the destination channel via the interconnect.

19. The computer system of claim 11, wherein the plurality of prescribed formats includes a sixteen gray format, a thirty-two RGB format, a thirty-two gray format, and a sixty-four RGB format.

20. The computer system of claim 11, wherein the plurality of prescribed formats includes a sixteen gray format, and a thirty-two RGB format.

21. The computer system of claim 11, wherein the plurality of prescribed formats includes a sixteen gray format, and a thirty-two gray format.

22. The computer system of claim 11, wherein the plurality of prescribed formats includes a sixteen gray format, and a sixty-four RGB format.

23. The computer system of claim 11, wherein the plurality of prescribed formats includes a thirty-two RGB format, and a thirty-two gray format.

24. The computer system of claim 11, wherein the plurality of prescribed formats includes a thirty-two RGB format, and a sixty-four RGB format.

25. The computer system of claim 11, wherein the plurality of prescribed formats includes a thirty-two gray format, and a sixty-four RGB format.

* * * * *